W. C. SANDMANN.
EGG LIFTER.
APPLICATION FILED NOV. 19, 1910.
1,081,701.
Patented Dec. 16, 1913.
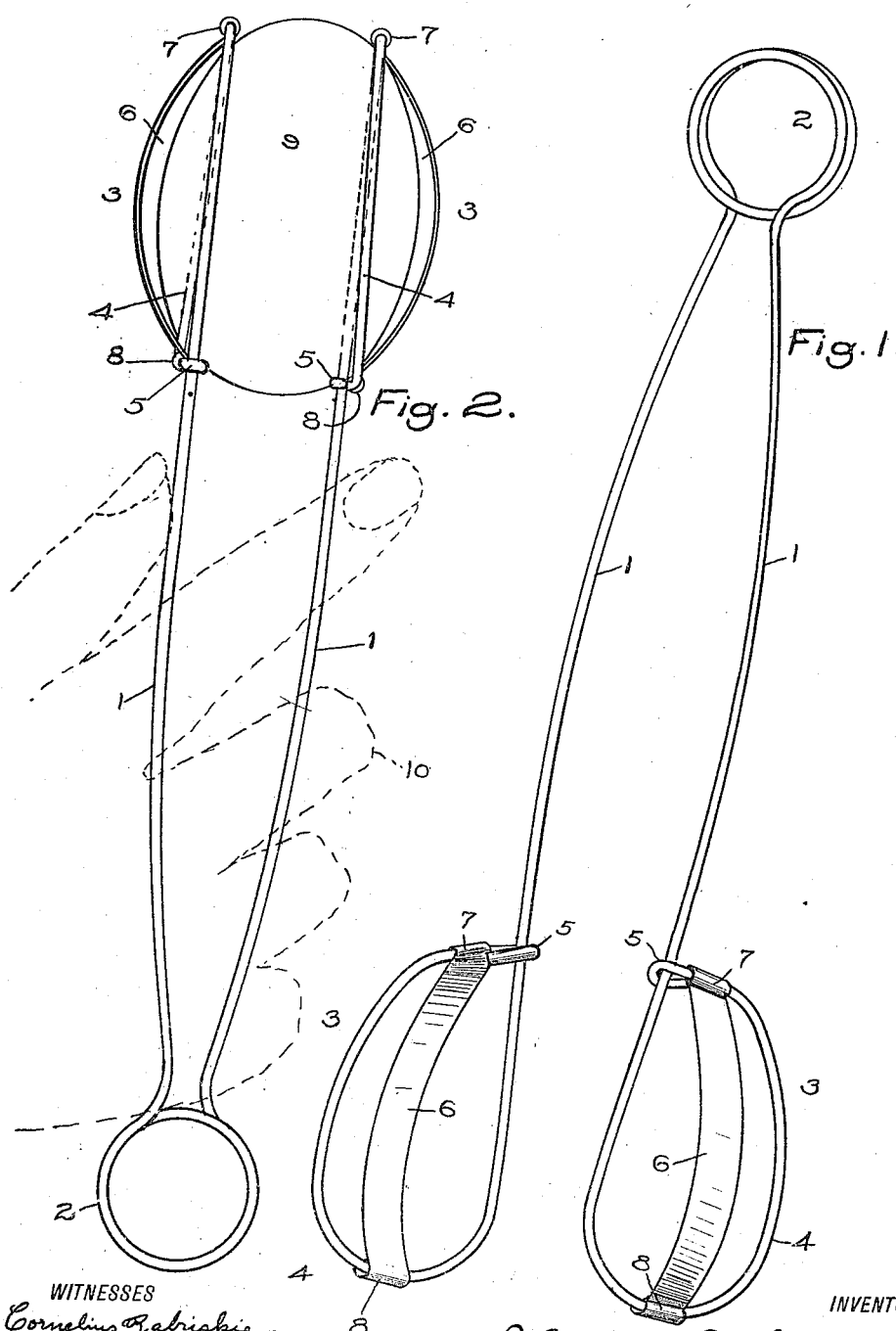

UNITED STATES PATENT OFFICE.

WILLIAM C. SANDMANN, OF NEWARK, NEW JERSEY.

EGG-LIFTER.

1,081,701. Specification of Letters Patent. Patented Dec. 16, 1913.

Application filed November 19, 1910. Serial No. 593,135.

*To all whom it may concern:*

Be it known that I, WILLIAM C. SANDMANN, a citizen of the United States, residing at Newark, in the county of Essex and State of New Jersey, have invented certain Improvements in Egg-Lifters, of which the following is a specification.

The objects of this invention are to provide an improved lifter for handling eggs in boiling the same, potatoes in baking or boiling, fruits in canning, sweet corn or other vegetables in cooking, sponges or cloths in washing jars or cans, and similar purposes; to secure a simple and cheap construction, which shall enable the lifter to grasp and hold a large variety of objects, and to obtain other advantages and results as may be brought out in the following description.

Referring to the accompanying drawings, in which like numerals of reference indicate the same parts throughout the several figures, Figure 1 is a perspective view of my improved lifter, and Fig. 2 is a side elevation of the same grasping an egg.

In said drawings, 1, 1 indicate two resilient arms which tend to separate but can be readily pressed toward each other by grasping with the hand as indicated in dotted lines at 10 in Fig. 2. Preferably said arms 1, 1 are connected at one end by having the piece of wire of which both arms are formed bent into a double coil 2 between said arms, but other equivalent means could be employed. At the opposite ends of the arms 1, 1 from said connecting coil 2, said arms have jaws 3, 3 adapted to hold between themselves the article to be grasped or lifted, such as the egg 9 shown in Fig. 2. The frame of each jaw is formed by bending the wire beyond the arm 1 around in the form of a loop 4 and clasping its extremity about the arm as at 5.

Preferably, the wire is bent in one direction to form the loop on one arm, and in the other direction to form the loop on the other arm, as shown in the drawings. Said loops of course lie in planes substantially transverse to the direction of movement of the arms 1, and are adapted to approach each other flatwise when the said arms are pressed together. The arms are not exactly opposite in edge view of the lifter, but depart sufficiently from such position to bring the jaws 3, 3 opposite each other, which is more essential. The result of this is that the handle portions of the arms 1, 1 diverge at a small angle from each other so that they are not only more easily grasped in the hand, but furthermore there is a tendency to throw the two loops laterally with respect to each other and better hold the egg or other article between said loops.

The loops 4, 4 are preferably somewhat elongated in the direction of the length of the arms 1, 1, and each loop is provided with a strip 6 of sheet metal extending longitudinally of the loop and secured thereto by wrapping the ends of said strip around the wire of the loop, as at 7 and 8, so that sleeves are formed at the ends of said strips 6 inclosing the wire of the loop at its opposite ends between the rounded corners, said sleeves being long enough to prevent their sliding around said corners. These strips are not straight, but are bowed or curved out of the planes of their loops in directions away from each other, as clearly shown in Fig. 2. The jaws 3, 3 thus provide facing pockets or cavities into which an article grasped by them may project to prevent its escape.

The construction is simple and cheap, and at the same time very effective. The strips 6, 6 cannot slip sidewise and become displaced, because of the curvature of the wire of the loops, and the strips in turn hold the ends of wire which are bent around the arms at 7 and 8 from slipping. This holding is necessary because the loops 5 are upon substantially straight portions of the arms 1, and said arms do not offer any resistance to the sliding of said loops. It will be noted that the arms 1, 1 are substantially straight practically to the extreme end of the lifter away from the coil 2, and that the loops 4, 4, extend rearwardly from said extremity along the sides of the arms. This construction tends to simplicity and ease of manufacture and reduces the cost of the article very materially

Having thus described the invention, what I claim is:

An article of the character described, comprising substantially straight wire arms, the wire being bent laterally at the end of each arm and returned in the form of a closed loop with rounded corners and clasped at its extremity loosely around the arm, the two loops thus formed lying in substantially parallel planes transverse to the direction of movement of the arms toward and away from each other, a strip of sheet-metal extending across each loop in the direction of the length of the arm and bowed out of the plane of the loop away from the other loop, the ends of each strip being wrapped around the wire of its loop at the middles of the ends thereof and forming straight sleeves thereon, said strips holding the clasped ends of the loops against sliding along the arms and having their own sleeve-like ends held against sliding on the loops by the curvature of the rounded corners thereof, and means connecting said arms at their ends away from said loops so as to swing toward and away from each other.

WILLIAM C. SANDMANN.

Witneses:
  RUSSELL M. EVERETT,
  FRANCES E. BLODGETT.